Nov. 5, 1940.   H. SINCLAIR   2,220,463
CHANGE-SPEED OR SELECTIVE GEARING
Filed July 22, 1939
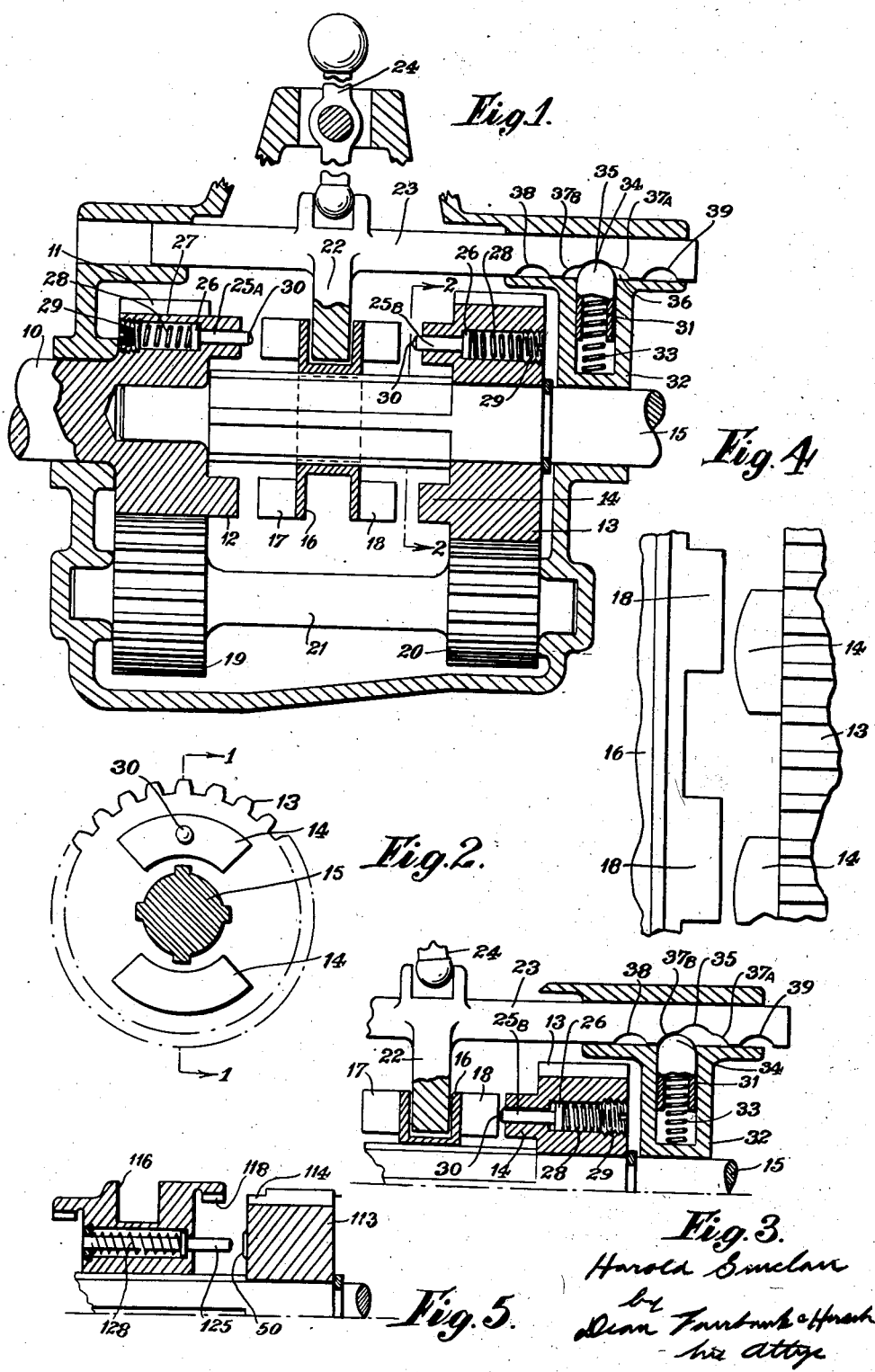

Patented Nov. 5, 1940

2,220,463

UNITED STATES PATENT OFFICE 2,220,463

CHANGE-SPEED OR SELECTIVE GEARING

Harold Sinclair, Kensington, London, England

Application July 22, 1939, Serial No. 285,983
In Great Britain December 30, 1938

6 Claims. (Cl. 192—67)

This invention relates to multi-speed gearing (which expression includes both change-speed and selective gearing) of the kind comprising a gear-selecting jaw-clutch and an operator's control member operable for meshing together the two toothed members of the clutch.

By "selective gearing" is meant a gearing, such as is employed for instance in cranes and excavators, wherein different output members, which are not necessarily arranged to rotate at different speeds for a given speed of the driving member, can be selectively coupled to the driving member.

Such gearing can be simple and robust, but it is subject to the drawback that, if the operator attempts to engage the jaw clutch while the gearing is running without first taking care that the speeds of the two toothed members of the clutch are substantially synchronised, either the two sets of teeth will be forcibly grated over each other or a crash engagement of the teeth will occur, with consequent undue wear and tear on the gearing and associated mechanism.

The object of this invention is to provide simple and effective means for assisting the operator in avoiding such grating or crashing, which means are especially suitable for use in connection with machines subject to jolting or lurching, such as in change-speed gearing of tractors and locomotives and in change-speed or selective gearing of cranes and excavators.

According to this invention, the improved multi-speed gearing of the kind set forth comprises means for introducing a resistance to movement of the operator's gear control member in the engaging direction at the point in its movement where the two toothed members will clatter lightly over each other on relative rotation but are incapable of positively meshing together, the connection between the control member and the clutch being of such a kind that this clattering will produce in the control member, a vibration, reduction in the frequency of which indicates to the operator an approach to synchronism of the speeds of the two toothed members. Such clattering may be due to light contact between the inter-engageable teeth of the jaw-clutch members, these teeth having their ends so shaped as to resist inter-meshing when the toothed members are rotating relatively to each other in either direction. Alternatively the clattering may be brought about by an auxiliary resilient tooth which forms a part of one of the toothed members and which is adapted to cooperate with either the main teeth or an auxiliary tooth on the other of the toothed members.

The invention will be further described, by way of example, with reference to the accompanying drawing, in which:

Fig. 1 is a sectional side elevation of a two-speed gear embodying the invention, Fig. 2 is a section on the line 2—2 in Fig. 1, Fig. 3 shows a part of the gearing as seen in Fig. 1, but in different configuration, Fig. 4 is a developed view of an alternative form of jaw clutch teeth, and Fig. 5 is a section of a part of a further modification of the mechanism shown in Fig. 1.

The gearing shown in Fig. 1 is generally of conventional design and it may be connected through a main clutch to a driving motor. This main clutch is conveniently a hydraulic coupling having a rotary reservoir and a scoop device in the reservoir capable in one condition of being inoperative and in another condition of transferring liquid from the reservoir to the working circuit of the coupling and to a control duct of a hydraulically actuated circuit-emptying valve. A coupling of this kind is shown in Fig. 4 of the specification of patent application No. 199,901 filed April 4, 1938, now Patent No. 2,187,667.

The gearing has an input shaft 10 rigid with an input pinion 11 and jaw-clutch teeth 12. A driven gear wheel 13 provided with jaw-clutch teeth 14 is journalled on and incapable of sliding along an output shaft 15. A sliding jaw clutch member 16 has teeth 17 and 18 engageable respectively with the teeth 12 and 14 as the member 16 is moved one side and the other of the neutral position which it occupies in Fig. 1. The gear wheels 11 and 13 mesh respectively with gear wheels 19 and 20 fast on a countershaft 21. The sliding clutch member 16 is actuated by a striking yoke 22 formed on a selector rod 23 controlled by an operator's control lever 24.

The jaw-clutches preferably have coarse-pitch teeth. For example each element may have only two teeth, as shown in Fig. 2. One element of each jaw clutch—for example the two gear wheels—is provided with an auxiliary feeler tooth which is displaceable relative to the main teeth in the engaging direction. These auxiliary teeth are formed by plungers 25A and 25B slidable respectively in axial holes in a tooth 12 and a tooth 14. The plungers have heads 26 located in enlarged bores 27 in the wheels and loaded by springs 28 retained by plugs 29, in such a manner that, when one or other of the clutches is disengaged, the rounded end 30 of the associated plunger protrudes above the end of the tooth.

The selector rod 23 is located by a plunger 31 having a rounded nose 34 and slidable in a bore 32 in the gear casing under the influence of a spring 33. The selector rod is provided with a low-speed notch 38 and a high-speed notch 39 of ordinary design. The neutral notch 36 is longer than the diameter of the plunger 31 and its base is formed by two slightly sloping portions meeting at a central recess 35, its length being such as to permit a limited range of lightly restrained movement to the selector rod, between positions where the ends 37A and 37B of the notch 36 are engaged respectively with the locating plunger 31.

This mechanism operates as follows. It will be assumed that the gearing has been running on direct drive, with the teeth 12 and 17 engaged together, and that it is desired to change to low speed while the output shaft 15 continues to rotate, for example owing to the inertia of the mechanism driven thereby. The control lever 24 is first moved by the operator in the usual way (for example after disengaging the main clutch between the driving engine and the gear) to disengage direct drive and is displaced by a relatively light force on the part of the operator beyond the mid position shown in Fig. 1 until it reaches the position shown in Fig. 3, in which the end 37B of the notch 36 is in contact with the end 34 of the locating plunger 31, whereby a substantial resistance is introduced to further movement of the control lever. The length and disposition of the notch 36 are such that in this condition the teeth 18 will clatter lightly over the end 30 of the feeler plunger 25B, as the speed of the clutch member is higher than that of the gear wheel 13, this clattering producing a vibration in the control lever 24. The operator now operates other controls (for example re-engages the main clutch and accelerates the driving engine) so as to accelerate the shaft 10 and with it the wheel 13, with the result that the frequency of the vibration of the lever 24 decreases. As this frequency becomes zero, the operator applies to the lever 24 an increased force sufficient to overcome the said resistance by forcing the locating plunger 31 down the end 37B of the notch 36 and into the notch 38, the teeth 14 and 18 now being fully engaged together.

The change from low gear to direct drive is made similarly, the end 37A of the notch 36 engaging the locating plunger 31 and restraining the selector rod in a position such that the feeler plunger 25A clatters lightly over the teeth 17.

In a modification of the arrangement just described the plungers 25A and 25B are omitted and at least one tooth of one of each pair of toothed members is provided with a convex end, that is to say of rounded or ridged shape, projecting beyond the torque-transmitting flanks of all the teeth on that member. As shown in Fig. 4, for example, the teeth 14 have slightly convex ends, while the teeth 18 have squared ends. The selector notch in this case is arranged to restrain movement of the jaw clutch member 16 in the engaging direction at a point such that the rounded ends of the teeth 14 will clatter lightly over the ends of the teeth 18.

Where an auxiliary resilient feeler tooth is provided, it may co-operate with a projection or serrations formed on or fixed for rotation with the mating toothed member and distinct from the jaw-clutch teeth thereon, and in the following claims the expression "toothed member" where the context allows is intended to include any such additional projection or serration.

Thus in Fig. 5, the sliding jaw-clutch member 116 has teeth 118 engageable with the cut-down ends 114 of the teeth of the gear wheel 113. An auxiliary feeler tooth formed as a plunger 125 loaded by a spring 126 is slidably mounted in the member 116 and co-operates with a relatively small number of serrations 50 formed on the side of the wheel 113. When the member 116 is moved by the control lever, as hereinbefore described, towards the wheel 113, it is restrained by the locating plunger of the selecting mechanism in a position such that the end of the feeler plunger 125 clatters lightly over the serrations 50 while the teeth 114 and 118 are still disengaged. When the jaw clutch engages fully, the plunger is forced back through the member 116.

I claim:

1. In a multi-speed gearing, a gear-selecting jaw clutch having two toothed members, an operator's gear control member operable for meshing together said two toothed members, and means for introducing a resistance to movement of said control member in the clutch engaging direction at the point in its movement where said two toothed members will clatter lightly over each other on relative rotation but are incapable of positively meshing together, the connection between said control member and one of said toothed members being of such a kind that this clattering will produce in the control member a vibration, reduction in the frequency of which indicates to the operator an approach to synchronism of the speeds of said two toothed members.

2. In a multi-speed gearing, a gear-selecting jaw clutch having two toothed members, an operator's gear control member operable for meshing together said two toothed members, means including a projection resiliently engaging in a notch for restraining movement of said control member within a neutral range, said means providing at most a relatively lightly restrained movement of said control member to a point, in its movement in the clutch-engaging direction, where said two toothed members will clatter lightly over each other on relative rotation but are incapable of positively meshing together while said notch and projection are still engaged together, the connection between said control member and one of said toothed members being of such a kind that this clattering will produce in the control member a vibration, reduction in the frequency of which indicates to the operator an approach to synchronism of the speeds of said toothed members, and the control member being capable of movement beyond said point in consequence of application by the operator of an increased force sufficient to disengage said projection from said notch and to mesh said two toothed members positively together.

3. In a multi-speed gearing, a gear-selecting jaw clutch having two toothed members which are capable of being meshed together and one of which has a tooth provided with a convex end projecting beyond the torque-transmitting flanks of all the teeth of the same member, an operator's gear control member for meshing together said toothed members, and means for introducing a resistance to movement of said control member in the clutch engaging direction at a point in its movement where said convex tooth end will clatter lightly over the teeth of the other toothed member on relative rotation, the connection between said control member and one of said toothed members being of such a kind that this clattering will produce in the control member a vibration, reduction in the frequency of which indicates to the operator an approach to synchronism of the speeds of said two toothed members.

4. In multi-speed gearing, a gear-selecting jaw clutch having two toothed members, an operator's gear control member operable for meshing together said two toothed members, an auxiliary tooth displaceably mounted on one of said toothed members and capable of engaging a tooth on the other of said toothed members, and means for introducing a resistance to movement of said control member in the clutch engaging direction at the point in its movement where said auxiliary tooth will clatter lightly over said tooth on the other of said toothed members but where said toothed members are incapable of positively meshing together, the connection between said control member and one of said toothed members being of such a kind that this clattering will produce in the control member a vibration, reduction in the frequency of which indicates to the operator an approach to synchronism of the speeds of said toothed members.

5. In multi-speed gearing, a gear-selecting jaw clutch having two toothed members which are capable of being meshed together, and shifting mechanism including an operator's control member for actuating one of said toothed members and also including locating means which relatively lightly restrain said control member in a neutral position and which more strongly restrain said control member, upon movement of the latter in the clutch engaging sense, at a point in its movement where said two toothed members will clatter over each other on relative rotation but will be incapable of positively meshing together, said shifting mechanism being capable of producing in response to such clattering a vibration in said control member serving as a synchronizing signal to the operator.

6. In multi-speed gearing having a gear case, a gear-selecting jaw clutch having two co-operating toothed members, a selector operable for shifting one of said toothed members, locating means for said selector including an elongated notch in said selector and a locating member resiliently mounted in said gear case for co-operation with said notch, said notch having a recess positioned to accommodate a part of said locating member when said selector is in the neutral position, and an end of said notch being so positioned as to abut against a part of said locating member when said selector is in position to permit said toothed members on their relative rotation to clatter over each other without positive engagement, and an operator's control member connected to said selector by means capable of transmitting a vibration to said control member in response to such clattering of the jaw clutch.

HAROLD SINCLAIR.